United States Patent
Ishikawa

(10) Patent No.: US 11,050,310 B2
(45) Date of Patent: Jun. 29, 2021

(54) ROTOR, MOTOR, FAN, COMPRESSOR, AND AIR CONDITIONING APPARATUS

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 251 days.

(21) Appl. No.: 16/097,918

(22) PCT Filed: Jul. 11, 2016

(86) PCT No.: PCT/JP2016/070414
§ 371 (c)(1),
(2) Date: Oct. 31, 2018

(87) PCT Pub. No.: WO2018/011850
PCT Pub. Date: Jan. 18, 2018

(65) Prior Publication Data
US 2019/0148999 A1    May 16, 2019

(51) Int. Cl.
| | |
|---|---|
| *H02K 1/27* | (2006.01) |
| *F04C 29/00* | (2006.01) |
| *H02K 21/14* | (2006.01) |
| *F04C 18/02* | (2006.01) |
| *F04C 23/02* | (2006.01) |

(Continued)

(52) U.S. Cl.
CPC ......... *H02K 1/274* (2013.01); *F04C 18/0215* (2013.01); *F04C 23/02* (2013.01);

(Continued)

(58) Field of Classification Search
CPC ........ H02K 1/274; H02K 1/165; H02K 21/14; H02K 29/03; H02K 2213/03; H02K 1/276;

(Continued)

(56) References Cited

U.S. PATENT DOCUMENTS

| | | | |
|---|---|---|---|
| 10,651,697 B2 * | 5/2020 | Kono | ........... H02K 1/02 |
| 2008/0231989 A1 | 9/2008 | Oki et al. | |

(Continued)

FOREIGN PATENT DOCUMENTS

| | | | |
|---|---|---|---|
| DE | 102015205749 A1 * | 10/2016 | ............... B60K 6/26 |
| JP | 2008-252968 A | 10/2008 | |

(Continued)

OTHER PUBLICATIONS

International Search Report of the International Searching Authority dated Sep. 20, 2016 for the corresponding international application No. PCT/JP2016/070414 (and English translation).

(Continued)

*Primary Examiner* — Forrest M Phillips
(74) *Attorney, Agent, or Firm* — Posz Law Group, PLC

(57) ABSTRACT

A rotor includes a rotor core having a cylindrical outer circumferential surface around an axis line, the rotor core further having a first end and a second end that are both ends in a direction of the axis line, a first permanent magnet disposed in a region of the rotor core having the first end, and a second permanent magnet disposed in another region of the rotor core having the second end. The first permanent magnet is inclined so that a distance from the axis line to the first permanent magnet increases in a direction along the axis line toward the first end. The second permanent magnet is inclined so that a distance from the axis line to the second permanent magnet increases in a direction along the axis line toward the second end.

16 Claims, 12 Drawing Sheets

(51) Int. Cl.
  *F25B 31/02* (2006.01)
  *H02K 1/16* (2006.01)
  *H02K 29/03* (2006.01)
(52) U.S. Cl.
  CPC ........ *F04C 29/0085* (2013.01); *F25B 31/026* (2013.01); *H02K 1/165* (2013.01); *H02K 1/276* (2013.01); *H02K 21/14* (2013.01); *F04C 2240/40* (2013.01); *H02K 29/03* (2013.01); *H02K 2213/03* (2013.01)
(58) Field of Classification Search
  CPC .. F04C 18/0215; F04C 23/02; F04C 29/0085; F04C 2240/40; F25B 31/026
  See application file for complete search history.

(56) References Cited

U.S. PATENT DOCUMENTS

| | | | | |
|---|---|---|---|---|
| 2013/0293037 | A1* | 11/2013 | Sakamoto | H02K 1/278 310/44 |
| 2013/0334925 | A1* | 12/2013 | Uematsu | H02K 1/274 310/216.092 |
| 2015/0077034 | A1* | 3/2015 | Kaneko | H02K 1/274 318/722 |
| 2016/0181896 | A1* | 6/2016 | Masubuchi | H02K 1/2766 29/598 |
| 2017/0179779 | A1* | 6/2017 | Kaiser | H02K 1/2766 |
| 2017/0201138 | A1* | 7/2017 | Leonardi | H02K 1/04 |
| 2018/0115206 | A1* | 4/2018 | Okumura | H01B 1/026 |

FOREIGN PATENT DOCUMENTS

| | | |
|---|---|---|
| JP | 2010-200510 A | 9/2010 |
| JP | 2014-204599 A | 10/2014 |
| WO | 2017/056480 A1 | 4/2017 |

OTHER PUBLICATIONS

Office Action dated May 21, 2019 issued in corresponding JP patent application No. 2018-527052 (and English translation).

* cited by examiner

ROTOR, MOTOR, FAN, COMPRESSOR, AND AIR CONDITIONING APPARATUS

CROSS REFERENCE TO RELATED APPLICATION

This application is a U.S. national stage application of International Patent Application No. PCT/JP2016/070414 filed on Jul. 11, 2016, the disclosure of which is incorporated herein by reference.

TECHNICAL FIELD

The present invention relates to a rotor, a motor, a fan, a compressor, and an air conditioning apparatus.

BACKGROUND ART

In recent years, an increase in efficiency of motors is required in order to reduce energy consumption. Thus, there has been proposed a motor of an inner rotor type in which a length of a rotor in an axial direction is longer than a length of a stator in the axial direction (see, for example, Patent Reference 1). As the length of the rotor in the axial direction increases, a permanent magnet mounted on the rotor can be enlarged, and therefore a larger magnetic force can be obtained (see, for example, Patent References 1 and 2).

PATENT REFERENCE

Patent reference 1: Japanese Patent Application Publication No. 2008-252968 (see FIG. 2)
Patent Reference 2: Japanese Patent Application Publication No. 2014-204599 (see FIG. 9)

In this case, however, part of magnetic fluxes from an end of the permanent magnet in the axial direction fails to enter the stator and becomes leakage magnetic fluxes, and there is a problem that effective magnetic fluxes decrease. The leakage magnetic fluxes hinder an increase in efficiency of the motor.

SUMMARY

The present invention is made to solve the above described problem, and an object of the present invention is to enhance energy efficiency of a motor by reducing leakage magnetic fluxes.

A rotor according to the present invention includes a rotor core having a cylindrical outer circumferential surface about an axis line, the rotor core having a first end and a second end that are both ends in a direction of the axis line, a first permanent magnet disposed in a region of the rotor core having the first end, and a second permanent magnet disposed in another region of the rotor core having the second end. The first permanent magnet is inclined so that a distance from the axis line to the first permanent magnet increases in a direction along the axis line toward the first end. The second permanent magnet is inclined so that a distance from the axis line to the second permanent magnet increases in a direction along the axis line toward the second end.

According to the present invention, the first permanent magnet and the second permanent magnet are inclined. Thus, even in a case where a length of the rotor core in the axial direction is longer than a length of a stator core in the axial direction, magnetic fluxes from ends of the permanent magnet easily enter the stator. As a result, leakage magnetic fluxes can be reduced, and energy efficiency of the motor can be enhanced.

DETAILED DESCRIPTION

Embodiments of the present invention will be described hereinafter with reference to the drawings.

FIRST EMBODIMENT

Figure 1:
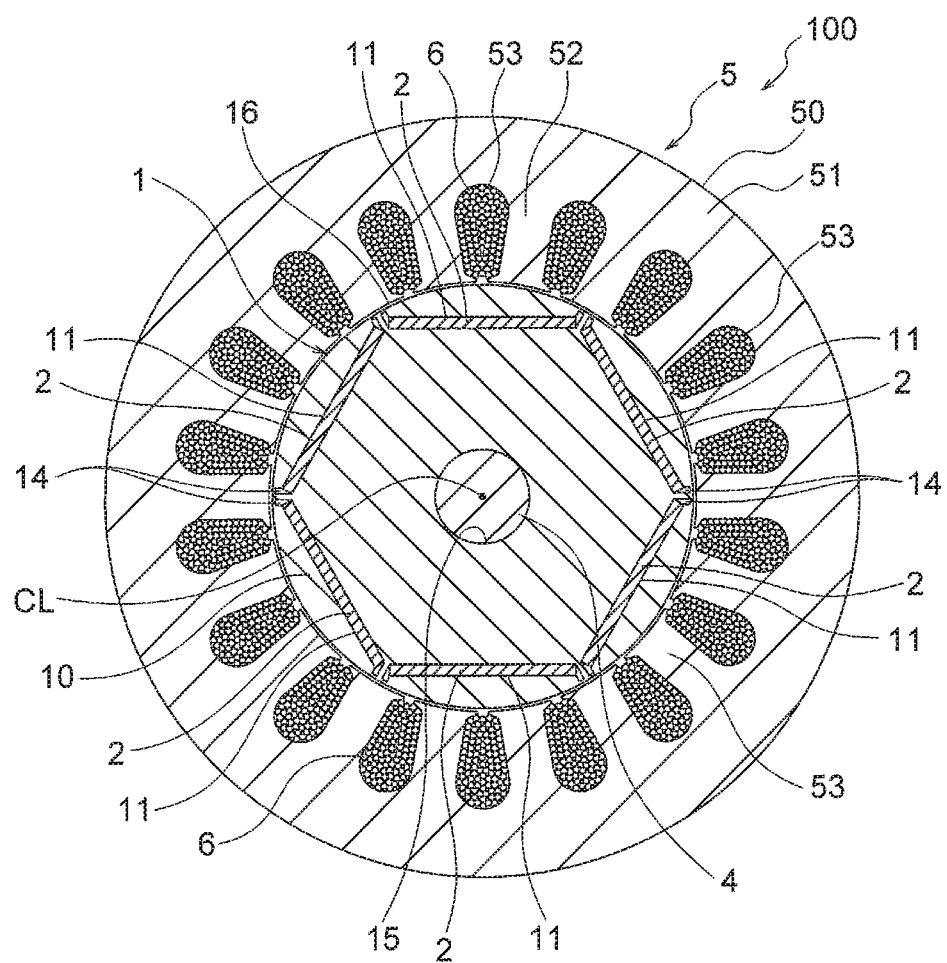
FIG. 1 is a cross-sectional view illustrating a motor according to a first embodiment.

FIG. 1 is a cross-sectional view illustrating a motor 100 according to a first embodiment. The motor 100 illustrated in FIG. 1 includes a stator 5 and a rotor 1 rotatably provided inside the stator 5. An air gap 16 is provided between the stator 5 and the rotor 1.

The rotor 1 includes a rotor core 10 having a plurality of magnet insertion holes 11 and permanent magnets 2 disposed in the respective magnet insertion holes 11. The rotor core 10 has a cylindrical outer circumferential surface about an axis line CL that is a rotation center. A shaft hole 15 is formed at a center of the rotor core 10 in a radial direction. A shaft 4 that is a rotation shaft is fixed in the shaft hole 15 by press fitting.

Hereinafter, a direction along an outer circumference (periphery) of the rotor core 10 will be referred to as a "circumferential direction". Further, a direction of the axis of the rotor core 10 (i.e., a direction of the axis line CL) will be referred to as an "axial direction". Further, a direction of a radius of the rotor core 10 will be referred to as a "radial direction".

The magnet insertion holes 11 penetrate the rotor core 10 in the axial direction. A plurality of (six in this example) magnet insertion holes 11 are formed at regular intervals in the circumferential direction of the rotor core 10. The magnet insertion holes 11 are grooves linearly extending in a plane perpendicular to the axial direction. The magnet insertion holes are arranged at a position as close to the outer circumferential surface of the rotor core 10 as possible.

The permanent magnets 2 are disposed in the magnet insertion holes 11. The permanent magnets 2 constitute magnetic poles of the rotor 1, and the number of the permanent magnets 2 in the circumferential direction is equal to the number of poles of the rotor 1. That is, the number of poles of the rotor 1 is six in this example. However, the number of poles of the rotor 1 is not limited to six, and it is sufficient that the number of poles is two or more.

The permanent magnet 2 is composed of a rare earth magnet mainly containing neodymium (Nd), iron (Fe), and boron (B) or a ferrite sintered magnet mainly containing iron oxide. The rare earth sintered magnet has high residual flux density and high coercive force, and thus can enhance efficiency of the motor 100 and resistance to demagnetization. The ferrite sintered magnet has high coercive force and is supplied stably, and thus can reduce manufacturing cost of the motor 100 and enhance resistance to demagnetization of the motor 100.

The permanent magnets 2 are magnetized to have different magnetic poles on an outer side and an inner side of the rotor core 10 in the radial direction. Further, the permanent magnets 2 adjacent to each other in the circumferential direction have opposite magnetization directions. For example, in a case where one permanent magnet 2 is magnetized to have a north pole on the outer side in the radial direction and a south pole on the inner side in the radial direction, its adjacent permanent magnet 2 in the circumferential direction is magnetized to have a south pole on the outer side in the radial direction and a north pole on the inner side in the radial direction.

Flux barriers 14 are formed at both ends of the magnet insertion hole 11 in the circumferential direction. Each flux barrier 14 is an opening extending in the radial direction from an end of the magnet insertion hole 11 in the circumferential direction toward the outer circumference of the rotor core 10. The flux barriers 14 are provided to reduce leakage magnetic fluxes between adjacent magnetic poles (i.e., magnetic fluxes flowing through an inter-pole part).

The stator 5 includes a stator core 50 and a winding 6 wound around the stator core 50. The stator core 50 is formed by, for example, stacking electromagnetic steel sheets each having a thickness of 0.1 to 0.7 mm in the axial direction and fixing the electromagnetic steel sheets by crimping or the like.

The stator core 50 includes an annular yoke part 51 and a plurality of (18 in this example) teeth 52 projecting inward from the yoke part 51 in the radial direction. The winding 6 is wound around the teeth 52 of the stator core 50. A slot 53 for housing the winding 6 is formed between ones of the teeth 52 adjacent to each other in the circumferential direction.

The winding 6 may be wound across two or more of the teeth 52 by distribution winding or may be wound around each of the teeth 52 by concentration winding. In this regard, three slots face one magnet insertion hole 11 in FIG. 1, but this embodiment is not limited to such a configuration.

Figure 2:
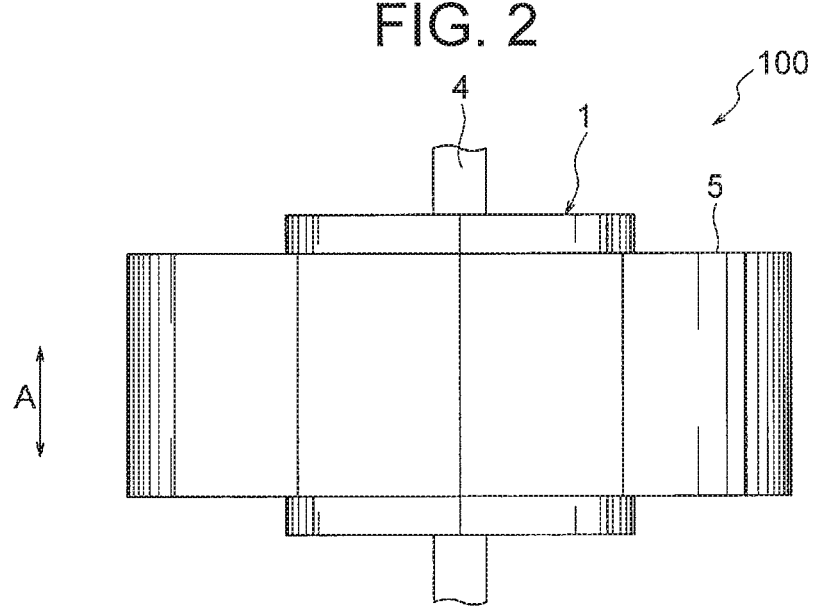
FIG. 2 is a side view illustrating the motor according to the first embodiment.
Figure 3:
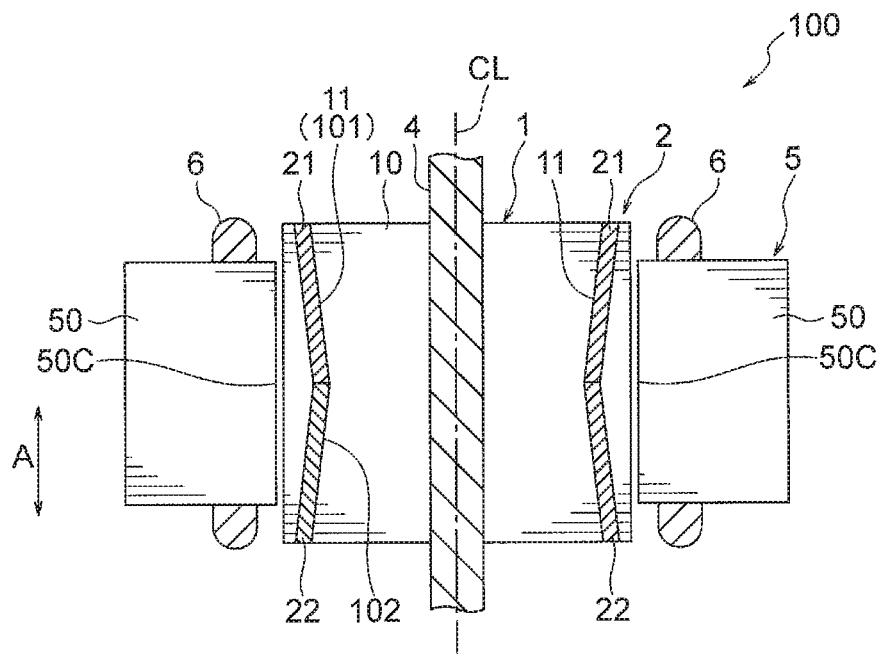
FIG. 3 is a sectional side view illustrating the motor according to the first embodiment.

FIGS. 2 and 3 are a side view and a sectional side view of the motor 100. As illustrated in FIG. 2, in the motor 100, a length (indicated by arrow A) of the rotor 1 in the axial direction is longer than a length of the stator 5 in the axial direction. That is, the motor 100 has a configuration in which the rotor 1 is overhung. With this configuration, the permanent magnets 2 attached to the rotor 1 can be enlarged in the axial direction, and a larger magnetic force can be obtained.

In this regard, as illustrated in FIG. 3, ends of the permanent magnets 2 in the axial direction project outward in the axial direction from the stator 5. Thus, part of magnetic fluxes emitted from the ends of the permanent magnets 2 in the axial direction do not enter the stator 5 and become leakage magnetic fluxes. When leakage magnetic fluxes occur, effective magnetic fluxes contributing to generation of a driving force decrease. Thus, in order to enhance efficiency of the motor 100 (i.e., enhance energy efficiency), it is necessary to reduce leakage magnetic fluxes.

For this reason, in the first embodiment, the permanent magnet 2 is divided into two parts, i.e., a first permanent magnet 21 and a second permanent magnet 22, in the axial direction, and the first permanent magnet 21 and the second permanent magnet 22 are arranged to be inclined relative to the axial direction (axis line CL) of the rotor 1. Each of the first permanent magnet 21 and the second permanent magnet 22 is inclined so that a distance from the axis line CL increases (i.e., a distance to the outer circumferential surface of the rotor 1 decreases) toward the end of the rotor core 10 in the axial direction.

Figure 4:
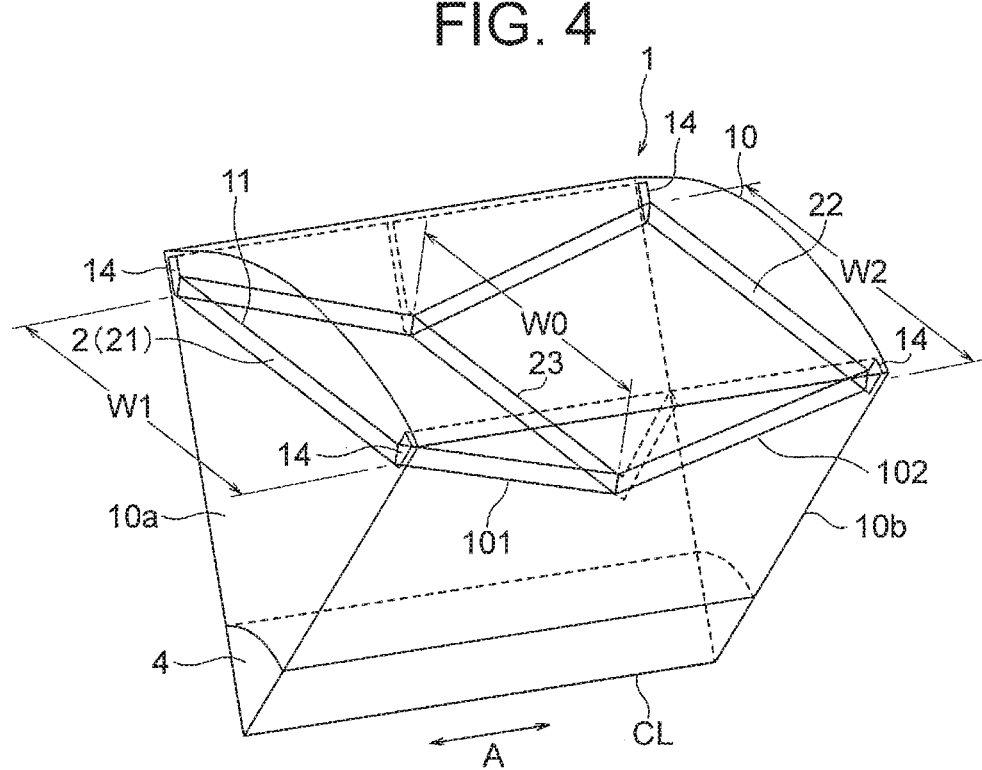
FIG. 4 is a schematic view illustrating arrangement of a first permanent magnet and a second permanent magnet in a rotor according to the first embodiment.

FIG. 4 is a view illustrating arrangement of the first permanent magnet 21 and the second permanent magnet 22 in the rotor 1. FIG. 4 shows a range of the rotor 1 at an angle of 60 degrees about the axis line CL. Further, the permanent magnets 21 and 22 are shown by solid lines. The rotor core 10 has a first end 10a that is one axial end and a second end 10b that is the other axial end.

Each of the first permanent magnet 21 and the second permanent magnet 22 has a flat-plate shape. The first permanent magnet 21 is disposed in a region of the rotor core 10 including the first end 10a. Further, the first permanent magnet 21 is inclined so that a distance from the axis line CL to the first permanent magnet 21 increases toward the first end 10a along the axial direction of the rotor core 10 (the direction of the axis line CL).

The second permanent magnet 22 is disposed in a region of the rotor core 10 including the second end 10b. Further, the second permanent magnet 22 is inclined so that a distance from the axis line CL to the second permanent magnet 22 increases toward the second end 10b along the axial direction of the rotor core 10.

A border 23 between the first permanent magnet 21 and the second permanent magnet 22 is located at a center part of the rotor core 10 in the axial direction. It is preferable to provide an insulation layer at the border 23 between the first permanent magnet 21 and the second permanent magnet 22. Further, it is also possible to separate the first permanent magnet 21 and the second permanent magnet 22 from each other.

The magnet insertion hole 11 of the rotor core 10 is divided into two parts, i.e., a first magnet insertion hole 101 in which the first permanent magnet 21 is disposed and a second magnet insertion hole 102 in which the second permanent magnet 22 is disposed. The first magnet insertion hole 101 is disposed in a region of the rotor core 10 including the first end 10a. The first magnet insertion hole 101 is inclined so that a distance from the axis line CL to the first magnet insertion hole 101 increases toward the first end 10a along the axial direction of the rotor core 10.

The second magnet insertion hole 102 is disposed in a region of the rotor core 10 including the second end 10b. The second magnet insertion hole 102 is inclined so that a distance from the axis line CL to the second magnet insertion hole 102 increases toward the second end 10b along the axial direction of the rotor core 10. The first magnet insertion holes 101 and the second magnet insertion holes 102 are continuous at the center part of the rotor core 10 in the axial direction.

The first magnet insertion hole 101 has the flux barriers (FIG. 1) on both sides of the first permanent magnet 21 in the circumferential direction, and each flux barrier 14 extends outward in the radial direction toward the outer circumferential surface of the rotor core 10. Similarly, the second magnet insertion hole 102 has the flux barriers 14 on both sides of the second permanent magnet 22 in the circumferential direction, and each flux barrier 14 extends outward in the radial direction toward the outer circumferential surface of the rotor core 10.

As illustrated in FIG. 4, the flux barrier 14 is formed so that a length of the flux barrier 14 increase toward the center part of the rotor core 10 in the axial direction. However, this embodiment is not limited to such a configuration, and the flux barrier 14 may have a uniform length throughout the entire region of the rotor core 10 in the axial direction.

The first permanent magnet 21 has a trapezoidal shape in which a length W1 in the circumferential direction at the first end 10a of the rotor core 10 is longer than a length W0 in the circumferential direction at the center part of the rotor core 10 in the axial direction. Similarly, the second permanent magnet 22 has a trapezoidal shape in which a length W2 in the circumferential direction at the second end 10b of the rotor core 10 is longer than a length W0 in the circumferential direction at the center part of the rotor core 10 in the axial direction.

In this regard, the first permanent magnet 21 and the second permanent magnet 22 are not limited to trapezoidal shapes, and may have rectangular shapes. That is, regarding the first permanent magnet 21, the length W1 in the circumferential direction at the first end 10a and the length W0 in the circumferential direction at the center part in the axial direction may be the same as each other. Similarly, regarding the second permanent magnet 22, the length W2 in the circumferential direction at the second end 10b and the length W0 in the circumferential direction at the center part in the axial direction may be the same as each other.

Figure 5:
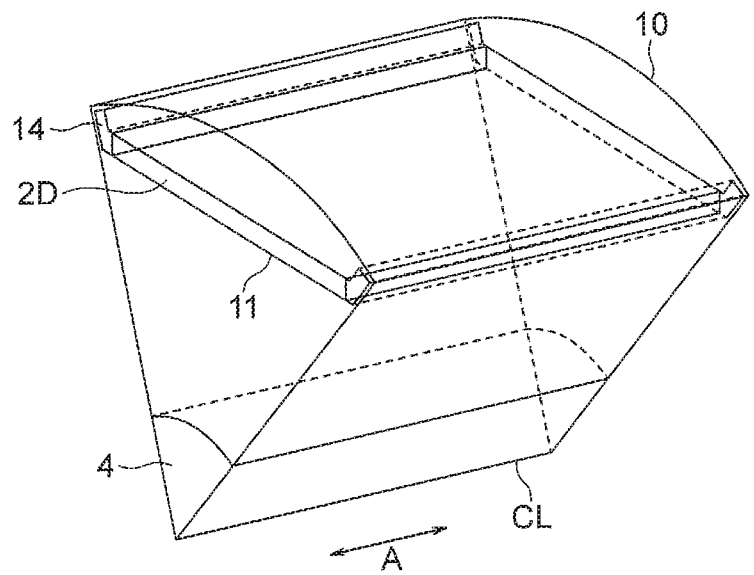
FIG. 5 is a schematic view illustrating arrangement of a permanent magnet in a rotor of a comparative example.

FIG. 5 is a view illustrating arrangement of a permanent magnet 2D in a rotor of a comparative example. In FIG. 5, the same reference numerals as those in the first embodiment are used for convenience of description. The rotor of the comparative example includes a single flat-plate permanent magnet 2D that is not divided in the axial direction. The permanent magnet 2D extends in parallel with the axial direction of the rotor.

Figure 6:
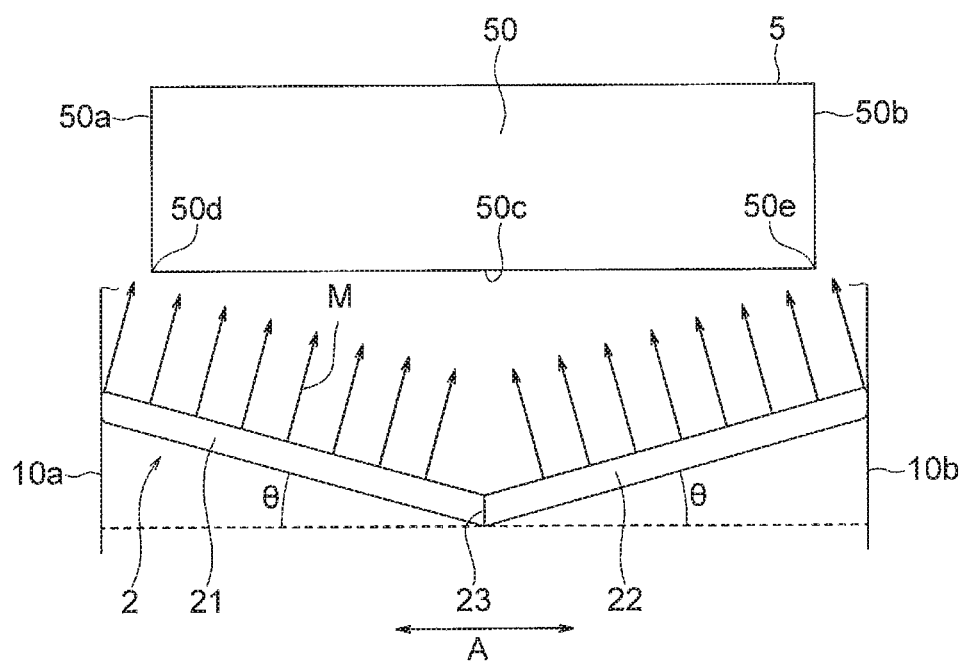
FIG. 6 is a schematic view for describing flows of magnetic fluxes from the first permanent magnet and the second permanent magnet in the first embodiment.

FIG. 6 is a schematic view for describing flows of magnetic fluxes from the first permanent magnet 21 and the second permanent magnet 22. Ends of the first permanent magnet 21 and the second permanent magnet 22 in the axial direction project outward in the axial direction from the ends 50a and 50b of the stator core 50 in the axial direction. Furthermore, each of the first permanent magnet 21 and the second permanent magnet 22 is inclined by an inclination angle θ relative to the axial direction of the rotor core 10 (the direction of the axis line CL).

As described above, the first permanent magnet 21 is inclined in such a direction that the distance from the axis line CL to the first permanent magnet 21 increases toward the first end 10a along the axial direction of the rotor core 10. As described above, the second permanent magnet 22 is inclined in such a direction that the distance from the axis line CL to the second permanent magnet 22 increases toward the second end 10b along the axial direction of the rotor core 10.

The magnetization direction of each of the first permanent magnet 21 and the second permanent magnet 22 is a thickness direction. Thus, magnetic fluxes are generated from surfaces of the first permanent magnet 21 and the second permanent magnet 22 in directions perpendicular to the surfaces. Since the first permanent magnet 21 and the second permanent magnet 22 are inclined as described above, the magnetic fluxes from the ends of the first permanent magnet 21 and the second permanent magnet 22 easily enter an inner circumferential surface 50c of the stator core 50. Accordingly, leakage magnetic fluxes can be reduced, and effective magnetic fluxes increase.

Effect is obtained when the inclination angle θ of each of the first permanent magnet 21 and the second permanent magnet 22 is larger than 0 (zero). However, if the inclination angle θ is excessively large, distances from the first permanent magnet 21 and the second permanent magnet 22 to the inner circumferential surface 50c of the stator core 50 become longer at the center part of the rotor core 10 in the axial direction, and effective magnetic fluxes entering the stator core 50 may decrease.

For this reason, a preferable range of the inclination angle θ of each of the first permanent magnet 21 and the second permanent magnet 22 relative to the axial direction (the direction of the axis line CL) is a range expressed by the following expression (1):

[Expression 1]

$$0 < \theta \le \tan^{-1}\left\{\frac{Z_r - Z_s}{2(g+h)}\right\} \quad (1)$$

Figure 7:
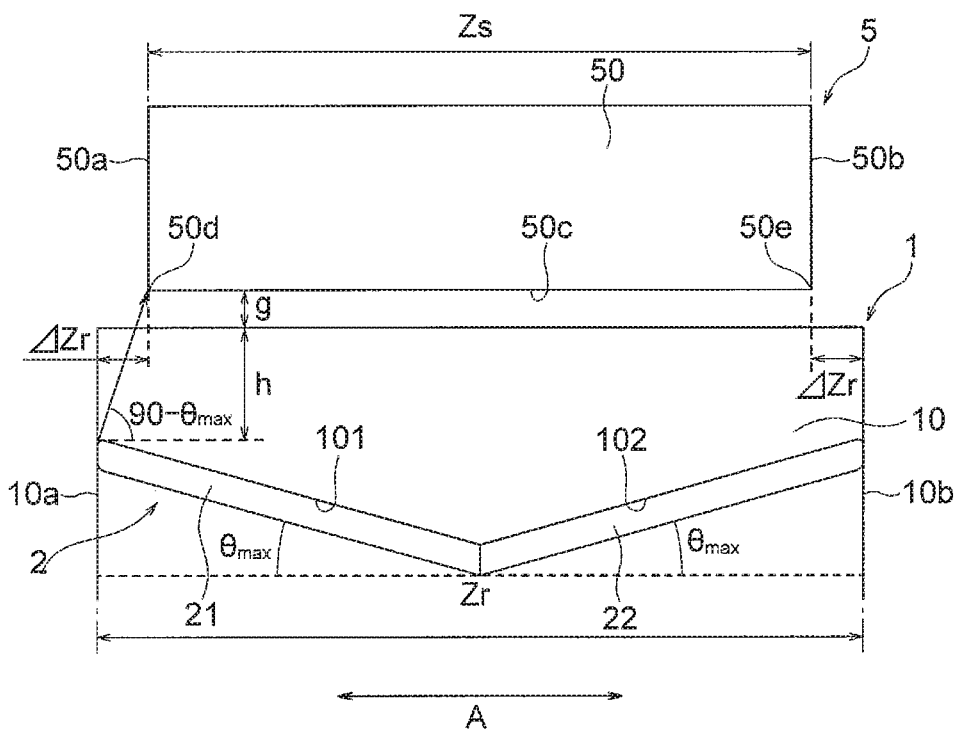
FIG. 7 is a schematic view illustrating arrangement of a rotor core, a stator core, the first permanent magnet, and the second permanent magnet in the first embodiment.

As illustrated in FIG. 7, g is a gap between rotor core 10 and the stator core 50. h is a minimum distance from the outer circumferential surface of the rotor core 10 to the first permanent magnet 21 and the second permanent magnet 22. $Z_r$ is a length (stacking thickness) of the rotor core 10 in the axial direction. $Z_s$ is a length (stacking thickness) of the stator core 50 in the axial direction. $\Delta Z$ is a value $(Z_r - Z_s)/2$ obtained by dividing a difference between the length $Z_r$ of the rotor core 10 in the axial direction and the length $Z_s$ of the stator core 50 in the axial direction by two.

An upper limit of the inclination angle $\theta$ in the expression (1) is expressed as $\theta_{max}$. The upper limit $\theta_{max}$ is obtained in the following manner. As illustrated in FIG. 7, when consideration is given to vectors of magnetic fluxes generated from ends of the first permanent magnet 21 and the second permanent magnet 22 and entering both ends 50d and 50e of the inner circumferential surface 50c of the stator core 50, the following expression (2) is obtained:

[Expression 2]

$$\tan(90 - \theta_{max}) = \frac{g+h}{\Delta z_r} = \frac{2(g+h)}{Z_r - Z_s} \quad (2)$$

From symmetry of a trigonometric function, a relationship of the following expression (3) is established:

[Expression 3]

$$\tan(90 - \theta_{max}) = \cot\theta_{max} = \frac{1}{\tan\theta_{max}} \quad (3)$$

When the expression (3) is applied to the expression (2), the following expression (4) is obtained, and the expression (5) is further obtained:

[Expression 4]

$$\tan(\theta_{max}) = \frac{Z_r - Z_s}{2(g+h)} \quad (4)$$

[Expression 5]

$$\theta_{max} = \tan^{-1}\left\{\frac{Z_r - Z_s}{2(g+h)}\right\} \quad (5)$$

From the expression (5), the upper limit $\theta_{max}$ of each of the angle $\theta$ of the first permanent magnet 21 and the second permanent magnet 22 relative to the axial direction of the rotor core 10 is obtained.

If the inclination angle $\theta$ is large, a proportion of magnetic fluxes entering the inner circumferential surface 50c of the stator core 50 increases among magnetic fluxes generated from the first permanent magnet 21 and the second permanent magnet 22, and therefore effective magnetic fluxes increase. However, if the inclination angle $\theta$ exceeds the upper limit $\theta_{max}$, the increase in effective magnetic fluxes levels off, whereas separation amounts of the first permanent magnet 21 and the second permanent magnet 22 from the stator core 50 increase with an increase in the inclination angle $\theta$, and therefore effective magnetic fluxes may decrease.

For this reason, the inclination angle $\theta$ of each of the first permanent magnet 21 and the second permanent magnet 22 relative to the axial direction is preferably less than or equal to the upper limit $\theta_{max}$, that is, within the range defined by the above described expression (1).

Figure 8A:
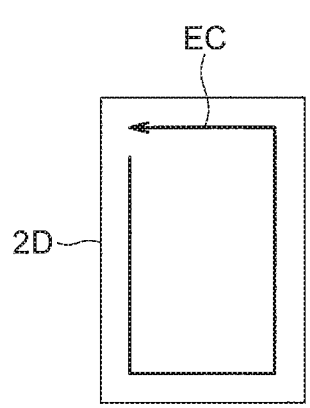
FIGS. 8(A) and 8(B) are schematic views for describing a reduction effect of an eddy-current loss in the first embodiment.
Figure 8B:
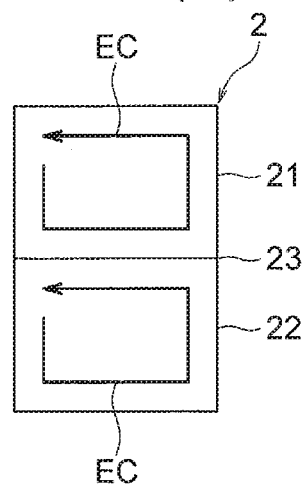

Next, an effect of reducing an eddy-current loss by dividing the permanent magnet 2 into the first permanent magnet 21 and the second permanent magnet 22 will be described. FIG. 8(A) is a schematic view illustrating a planar shape of the permanent magnet 2D of the comparative example (FIG. 5). FIG. 8(B) is a schematic view illustrating a planar shape of the permanent magnet 2 (the first permanent magnet 21 and the second permanent magnet 22) of the first embodiment.

It is known that in the case where the permanent magnet 2 is composed of a rare earth sintered magnet, eddy current (indicated by arrow EC in FIG. 8) occurs inside the permanent magnet 2 due to spatial harmonics generated in the gap 16 between the rotor core 10 and the stator core 50. Since the rare earth sintered magnet has electric resistance, occurrence of eddy current causes an eddy-current loss, and efficiency of the motor 100 decreases. In addition, since the eddy-current loss is converted to heat, it causes thermal demagnetization of the permanent magnet 2.

When the permanent magnet 2 is divided into two in the axial direction as illustrated in FIG. 8(B), a path through which eddy current flows is longer in the entire permanent magnet 2 than in the non-divided permanent magnet 2D illustrated in FIG. 8(A). Accordingly, electric resistance increases, and thereby eddy current can be reduced.

Figure 9:
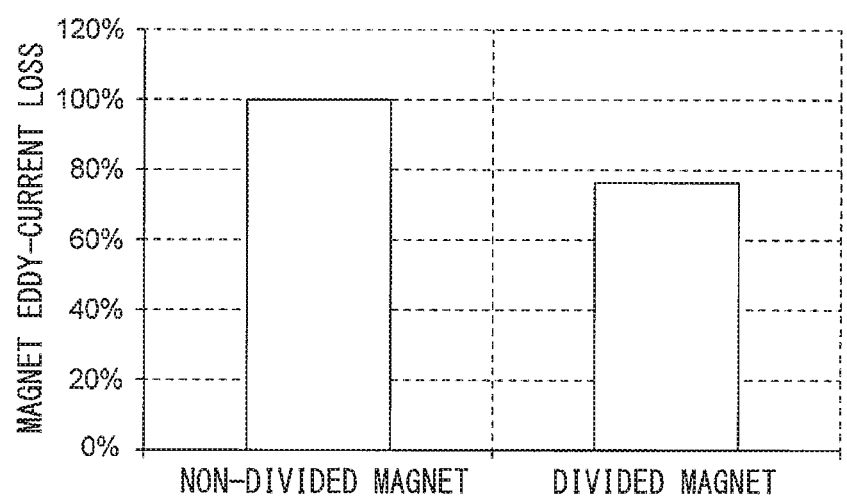
FIG. 9 is a schematic view for describing the reduction effect of the eddy-current loss in the first embodiment.

FIG. 9 is a graph showing simulation results of eddy-current losses of the non-divided permanent magnet 2D (FIG. 8(A)) and the divided permanent magnet 2 (FIG. 8(B)). From FIG. 9, it is understood that the eddy-current loss can be reduced by dividing the permanent magnet 2 into two in the axial direction.

In this regard, when the permanent magnet 2 is composed of a ferrite sintered magnet, the electric resistance is high because its main component is iron oxide, and the eddy-current loss is small.

Next, dimensions of the first permanent magnet 21 and the second permanent magnet 22 will be described. In a case where the first permanent magnets 21 and the second permanent magnets 22 are arranged to be inclined relative to the axial direction, it is necessary to prevent interference between the first permanent magnets 21 adjacent to each other in the circumferential direction and between the second permanent magnets 22 adjacent to each other in the circumferential direction. Here, description will be made to a case where each of the first permanent magnet 21 and the second permanent magnet 22 has a rectangular shape, that is, a case where the widths W1 and W2 illustrated in FIG. 4 are the same as the width W0.

Figure 10A:
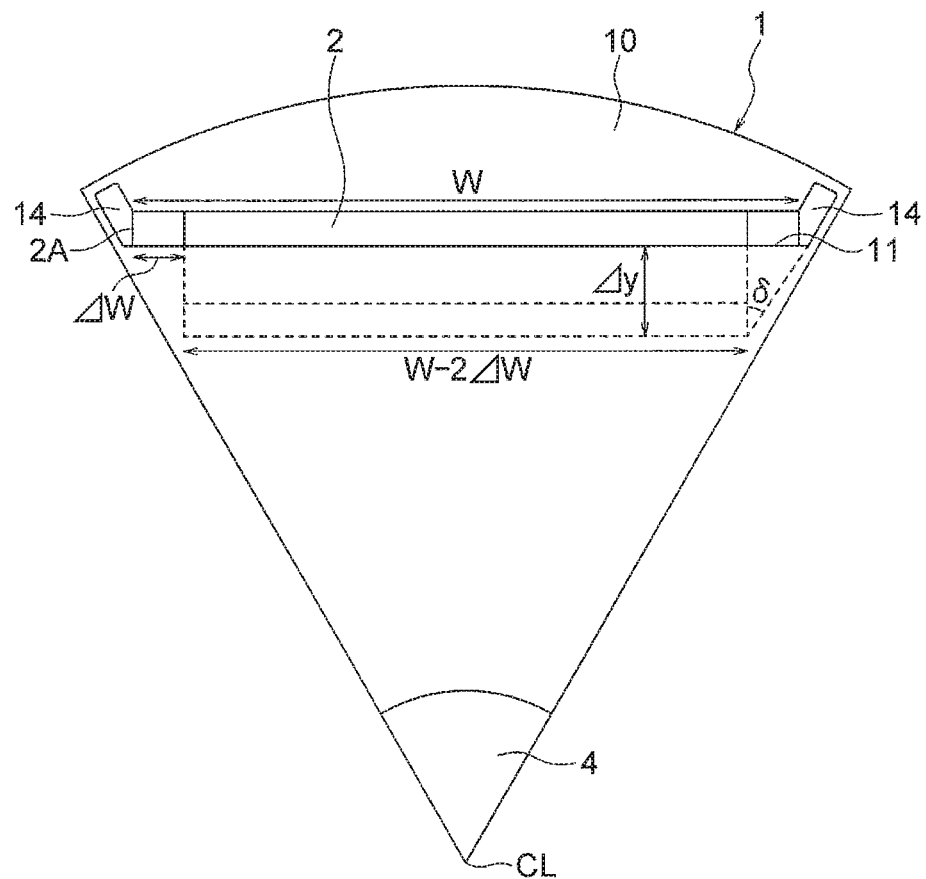
FIGS. 10(A) and 10(B) are schematic views illustrating arrangement of the first permanent magnet and the second permanent magnet in the rotor according to the first embodiment.
Figure 10B:
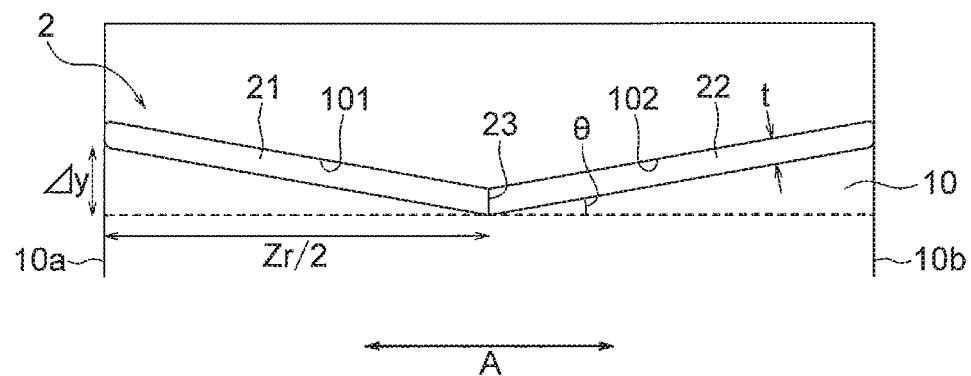

FIGS. 10(A) and 10(B) are respectively a plan view and a cross-sectional view illustrating a region of the rotor 1 where one permanent magnet 2 is disposed. The permanent magnet 2 (the first permanent magnet 21 and the second permanent magnet 22) has a length in the axial direction expressed as $Z_r$, a width (length in the circumferential direction) expressed as W, and a thickness expressed as t.

First, when it is assumed that the first permanent magnet 21 and the second permanent magnet 22 are arranged in parallel with the axial direction, a volume of the integrated permanent magnet having a flat-plate shape is expressed by the following expression (6):

[Expression 6]

$$V_1 = W \times Z_r \times t \ldots \quad (6)$$

Next, it is assumed that the first permanent magnets 21 and the second permanent magnets 22 are arranged at the inclination angle $\theta$ relative to the axial direction, and the width W is reduced by $\Delta W$ so as to prevent interference between the first permanent magnets 21 adjacent to each other in the circumferential direction and between the second permanent magnets 22 adjacent to each other in the circumferential direction. In this case, the total volume of the first permanent magnet 21 and the second permanent magnet 22 is expressed by the following expression (7):

[Expression 7]

$$V_2 = (W - 2\Delta W) \times \frac{Z_r}{\cos\theta} \times t \quad (7)$$

In the rotor core 10, when an angle range about the axis line CL of a region where one permanent magnet (the first permanent magnet 21 and the second permanent magnet 22) is disposed is 2δ, a reduction width ΔW can be expressed by the following expression (8):

[Expression 8]

$$\Delta W = \Delta y \times \tan\delta \ldots \quad (8)$$

Here, Δy is an amount of inclination of the first permanent magnet 21 and the second permanent magnet 22 as illustrated in FIG. 10(B), and is expressed by the expression (9):

[Expression 9]

$$\Delta y = \frac{Z_r}{2}\tan\theta \quad (9)$$

When the expression (9) is substituted into the expression (8), the obtained ΔW is substituted into the expression (7), and δ is set to 30 degrees, the following expression (10) is obtained:

[Expression 10]

$$V_2 = (W - 2\Delta y \times \tan\delta) \times \frac{Z_r}{\cos\theta} \times t = \quad (10)$$

$$\left(W - \frac{2}{\sqrt{3}}\Delta y\right) \times \frac{Z_r}{\cos\theta} \times t = \left(W - \frac{Z_r}{\sqrt{3}}\tan\theta\right) \times \frac{Z_r}{\cos\theta} \times t$$

Here, in accordance with the inclination angle θ of each of the first permanent magnet 21 and the second permanent magnet 22, the length $Z_r$ and the width W of the permanent magnet 2 (the first permanent magnet 21 and the second permanent magnet 22) are determined so that the volume $V_1$ in the expression (6) and the volume $V_2$ in the expression (10) are the same as each other.

If the volume is the same as that when the first permanent magnet 21 and the second permanent magnet 22 are arranged in parallel with the axial direction (i.e., $V_1 = V_2$), an area of the surface facing the stator core 50 is also the same since the thickness t is common. Thus, sufficient effective magnetic fluxes can be obtained. Accordingly, the first permanent magnet 21 and the second permanent magnet 22 can be efficiently arranged.

Figure 11A:
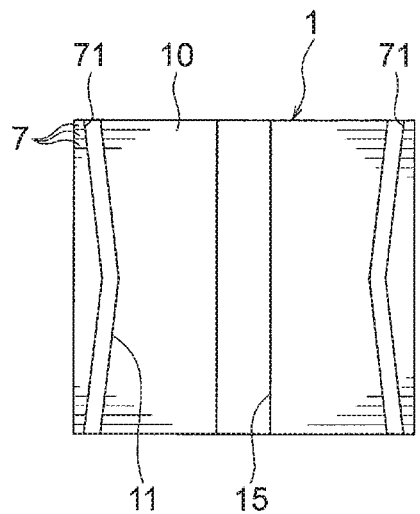
FIGS. 11(A) and 11(B) are schematic views illustrating configuration examples of the rotor core according to the first embodiment.
Figure 11B:
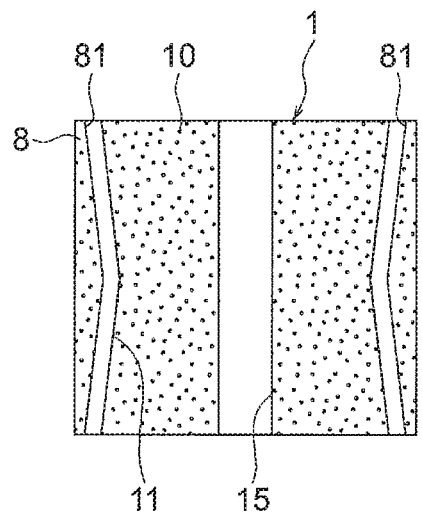

Next, a configuration of the rotor core 10 will be described. FIGS. 11(A) and 11(B) are schematic views illustrating a sectional shape of the rotor core 10. As illustrated in FIG. 11(A), the rotor core 10 can be formed by punching electromagnetic steel sheets 7 each having a thickness of 0.1 to 0.7 mm, for example, stacking the electromagnetic steel sheets 7 in the axial direction, and fastening the electromagnetic steel sheets 7 by crimping or the like.

The punching of the electromagnetic steel sheets 7 is performed while positions of the magnet insertion holes 71 in the electromagnetic steel sheets 7 are shifted from one another in the radial direction. Such punching can be performed by, for example, slide press. In the electromagnetic steel sheet 7 close to an end of the rotor core 10 in the axial direction, the magnet insertion hole 71 is formed at a position close to the outer circumference. In the electromagnetic steel sheet 7 close to the center part of the rotor core 10 in the axial direction, the magnet insertion hole 71 is formed at a position apart from the outer circumference. Thus, the magnet insertion holes 71 inclined relative to the axial direction can be formed in the rotor core 10.

Alternatively, as illustrated in FIG. 11(B), the rotor core 10 may be formed by a powder magnetic core 8. The powder magnetic core 8 is formed by press-molding a powdery magnetic material. The powder magnetic core 8 has magnetic permeability lower than that of the stacked electromagnetic steel sheets, but has a property of being less likely to cause eddy current. Thus, an eddy-current loss can be significantly reduced.

Further, since the powder magnetic core 8 is press-molded, the magnet insertion holes 11 inclined relative to the axial direction can be relatively easily formed. For example, the magnet insertion holes 81 can be formed by providing a mold for press-molding with a part having a shape corresponding to the magnet insertion holes 81.

Figure 12:
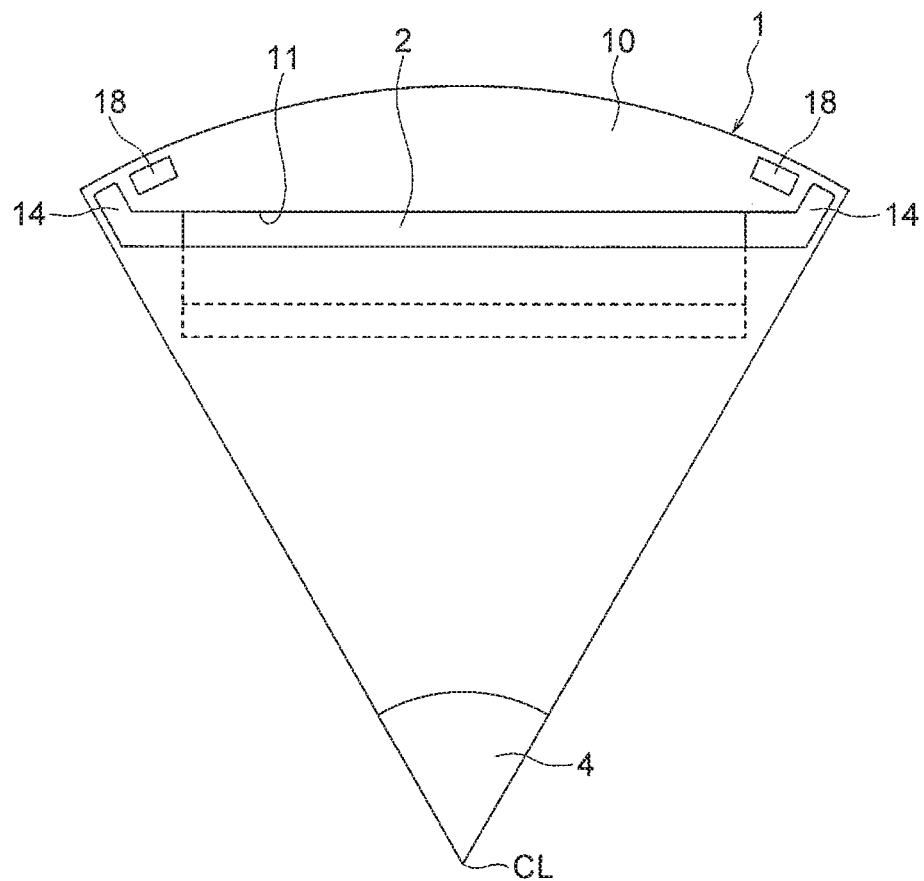
FIG. 12 is a schematic view illustrating a configuration example of the rotor according to the first embodiment.

Further, as illustrated in FIG. 12, the rotor core 10 may be provided with slits 18 on an outer side of the magnet insertion hole 11 in the radial direction. Here, a pair of slits 18 are disposed adjacent in the circumferential direction to two flux barriers 14 formed at both ends of the magnet insertion holes 11 in the circumferential direction. The slits 18 have a function of reducing flows of magnetic fluxes of the permanent magnet 2 into an adjacent permanent magnet 2 across an inter-pole part (i.e., leakage magnetic fluxes between adjacent magnetic poles).

As described above, the rotor 1 according to the first embodiment of the present invention includes the first permanent magnet 21 disposed in a region of the rotor core 10 including the first end 10a and the second permanent magnet 22 disposed in a region including the second end 10b. In addition, each of the first permanent magnet 21 and the second permanent magnet 22 is inclined so that the distance from the axis line CL increases toward the end of the rotor core 10 in the axial direction. Accordingly, even in a case where the length of the rotor core 10 in the axial direction is longer than that of the stator core 50, magnetic fluxes from ends of the first permanent magnet 21 and the second permanent magnet 22 can easily enter the stator core 50. As a result, leakage magnetic fluxes can be reduced, and energy efficiency of the motor 100 can be enhanced.

Further, the first permanent magnet 21 and the second permanent magnet 22 are composed of rare earth magnets containing neodymium, iron, boron, and dysprosium or ferrite sintered magnets containing iron oxide. Thus, due to high coercive forces of these materials, demagnetization of the first permanent magnet 21 and the second permanent magnet 22 can be suppressed against demagnetizing field and heat applied during operation of the motor 100. That is, the motor 100 having high resistance to demagnetization can be obtained at low cost.

Further, each of the first permanent magnets 21 and the second permanent magnets 22 has a trapezoidal shape (a shape whose length in the circumferential direction is shorter in a center part than in an end of the rotor core 10 in the axial direction). Thus, a plurality of first permanent magnets 21 having lengths in the circumferential direction as long as possible can be arranged without interference with each other, and a plurality of second permanent magnets 22 having lengths in the circumferential direction as long as possible can be arranged without interference with each other.

Further, since the rotor core 10 is composed of the powder magnetic core 8, the eddy-current loss can be reduced, and the inclined magnet insertion holes 11 can be easily formed.

Further, since the rotor core 10 is composed of the stacked electromagnetic steel sheets 7, efficiency of the motor 100 can be enhanced due to high magnetic permeability of the electromagnetic steel sheets 7. Furthermore, the inclined magnet insertion holes 11 can be formed by gradually shifting the positions of the magnet insertion holes 71 to be formed in the electromagnetic steel sheets 7.

Further, the first magnet insertion hole 101 has the flux barriers 14 (openings) on both sides of the first permanent magnet 21 in the circumferential direction, and the second magnet insertion hole 102 has the flux barriers 14 (openings) on both sides of the second permanent magnet 22 in the circumferential direction. Thus, leakage magnetic fluxes between magnetic poles adjacent to each other in the circumferential direction can be reduced in the rotor 1.

Further, the border 23 between the first permanent magnet 21 and the second permanent magnet 22 is located at the center part of the rotor core 10 in the axial direction. Thus, the magnet insertion hole 11 in which the first permanent magnet 21 and the second permanent magnet 22 are disposed has a V shape having an apex in the center part of the rotor core 10 in the axial direction. Accordingly, the first permanent magnet 21 and the second permanent magnet 22 can be easily fitted in the magnet insertion holes 11.

Further, since the length of the rotor core 10 in the axial direction is longer than the length of the stator core 50 in the axial direction, the lengths of the first permanent magnet 21 and the second permanent magnet 22 in the axial direction can be increased, and magnetic forces of the first permanent magnet 21 and the second permanent magnet 22 can be increased.

Further, the inclination angle θ of each of the first permanent magnet 21 and the second permanent magnet 22 relative to the axial direction (the direction of the axis line CL) is within the range of the above described expression (1). Thus, an increase in the distances from the first permanent magnet 21 and the second permanent magnet 22 to the stator core 50 can be suppressed, and thus effective magnetic fluxes entering the stator core 50 can be increased.

SECOND EMBODIMENT

Next, a second embodiment of the present invention will be described. In the second embodiment, a permanent magnet 2A disposed in a rotor 1A further includes a third permanent magnet 203 in addition to a first permanent magnet 201 and a second permanent magnet 202.

Figure 13:
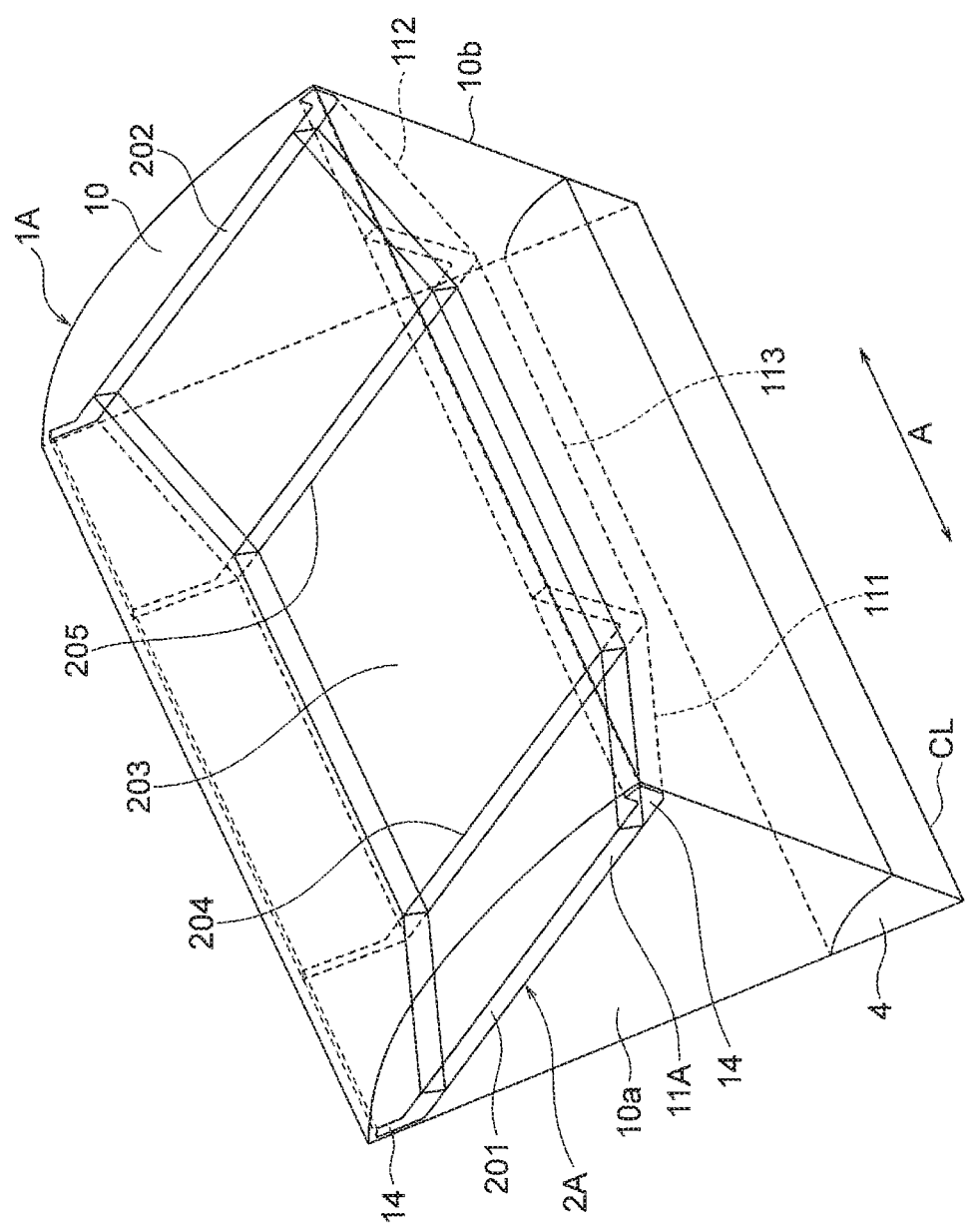
FIG. 13 is a schematic view illustrating arrangement of a first permanent magnet, a second permanent magnet, and a third permanent magnet in a rotor according to a second embodiment.

FIG. 13 is a view illustrating arrangement of the first permanent magnet 201, the second permanent magnet 202, and the third permanent magnet 203 in the rotor 1A according to the second embodiment. In this regard, FIG. 13 illustrates a range of the rotor 1A at an angle of 60 degrees about an axis line CL. Further, the permanent magnet 2A (the first permanent magnet 201, the second permanent magnet 202, and the third permanent magnet 203) is shown by solid lines. The rotor core 10 of the rotor 1A has a first end 10a that is one end in the axial direction (the direction of the axis line CL) and a second end 10b that is the other end in the axial direction.

As illustrated in FIG. 13, each of the first permanent magnet 201, the second permanent magnet 202, and the third permanent magnet 203 has a flat-plate shape.

The first permanent magnet 201 is disposed in a region of the rotor core 10 including the first end 10a. Further, the first permanent magnet 201 is inclined so that a distance from the axis line CL to the first permanent magnet 201 increases toward the first end 10a along the axial direction of the rotor core 10 (the direction of the axis line CL).

The second permanent magnet 202 is disposed in a region of the rotor core 10 including the second end 10b. Further, the second permanent magnet 202 is inclined so that a distance from the axis line CL to the second permanent magnet 202 increases toward the second end 10b along the axial direction of the rotor core 10.

The third permanent magnet 203 is disposed between the first permanent magnet 201 and the second permanent magnet 202, that is, disposed at a center region of the rotor core 10 in the axial direction, and is in parallel with the axial direction. In FIG. 13, a length of the third permanent magnet 203 in the axial direction is longer than a length of each of the first permanent magnet 201 and the second permanent magnet 202 in the axial direction, but may be shorter than the length of each of the first permanent magnet 201 and the second permanent magnet 202.

It is preferable to provide an insulating layer at a border 204 between the first permanent magnet 201 and the third permanent magnet 203. It is also possible to separate the first permanent magnet 201 and the third permanent magnet 203 from each other. Similarly, it is preferable to provide an insulation layer at a border 205 between the second permanent magnet 202 and the third permanent magnet 203. It is also possible to separate the second permanent magnet 202 and the third permanent magnet 203 from each other.

As is the case with the first permanent magnet 21 of the first embodiment, the first permanent magnet 201 has a trapezoidal shape or a rectangular shape. As is the case with the second permanent magnet 22 of the first embodiment, the second permanent magnet 202 has a trapezoidal shape or a rectangular shape. The third permanent magnet 203 has a rectangular shape.

A magnet insertion hole 11A of the rotor core 10 is divided into a first magnet insertion hole 111 in which the first permanent magnet 201 is disposed, a second magnet insertion hole 112 in which the second permanent magnet 202 is disposed, and a third magnet insertion hole 113 in which the third permanent magnet 203 is disposed.

The first magnet insertion hole 111 is disposed in a region of the rotor core 10 including the first end 10a. The first magnet insertion hole 111 is inclined so that a distance from the axis line CL to the first magnet insertion hole 111 increases toward the first end 10a along the axial direction of the rotor core 10.

The second magnet insertion hole 112 is disposed in a region of the rotor core 10 including the second end 10b. The second magnet insertion hole 112 is inclined so that a distance from the axis line CL to the second magnet insertion hole 112 increases toward the second end 10b along the axial direction of the rotor core 10.

The third magnet insertion hole 113 is disposed between the first magnet insertion hole 111 and the second magnet insertion hole 112 and extends in parallel with the axial direction.

Figure 14:
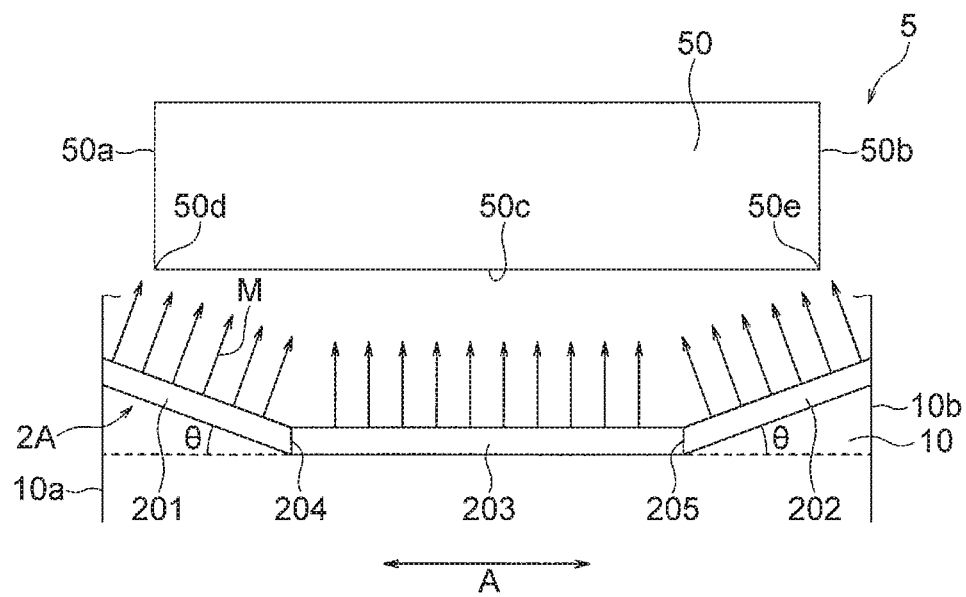
FIG. 14 is a schematic view for describing flows of magnetic fluxes from the first permanent magnet, the second permanent magnet, and the third permanent magnet in the second embodiment.

FIG. 14 is a schematic view for describing flows of magnetic fluxes from the first permanent magnet 201, the second permanent magnet 202, and the third permanent magnet 203. The magnetic fluxes from the first permanent magnet 201 and the second permanent magnet 202 perpendicularly to their surfaces enter the inner circumferential surface 50c of the stator core 50 (more specifically, a region on an inner side of both ends 50d and 50e in the axial direction). Further, magnetic fluxes generated from a surface of the third permanent magnet 203 perpendicularly to the surface enter the inner circumferential surface 50c of the stator core 50.

Since the first permanent magnet 201 and the second permanent magnet 202 are inclined relative to the axial direction as described above, leakage magnetic fluxes can be reduced in a manner similar to the first embodiment. Further, in the second embodiment, the third permanent magnet 203 parallel to the axial direction is disposed between the first permanent magnet 201 and the second permanent magnet 202. Thus, a distance from the permanent magnet 2A (the first permanent magnet 201, the second permanent magnet 202, and the third permanent magnet 203) to the stator core 50 can be reduced as compared with the first embodiment. Accordingly, effective magnetic fluxes entering the stator core 50 can be increased.

Next, dimensions of the first permanent magnet 201, the second permanent magnet 202, and the third permanent magnet 203 will be described. In a case where the first permanent magnet 201, the second permanent magnet 202, and the third permanent magnet 203 are arranged to be inclined relative to the axial direction, it is necessary to prevent interference between the first permanent magnets 201 adjacent to each other in the circumferential direction, between the second permanent magnets 202 adjacent to each other in the circumferential direction, and between the third permanent magnets 203 adjacent to each other in the circumferential direction. Here, description will be made to a case where each of the first permanent magnets 201, the second permanent magnets 202, and the third permanent magnets 203 has a rectangular shape.

Figure 15:
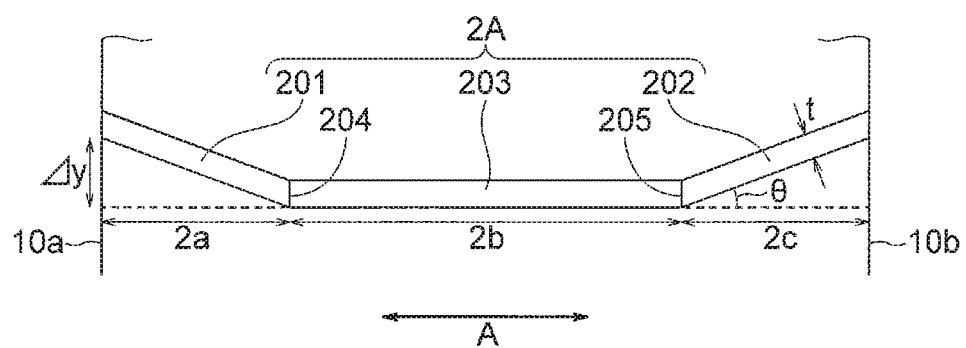
FIG. 15 is a schematic view illustrating arrangement of the first permanent magnet, the second permanent magnet, and the third permanent magnet in the rotor according to the second embodiment.

FIG. 15 is a sectional view illustrating a region of the rotor 1A where one permanent magnet 2A is disposed. The permanent magnet 2A (the first permanent magnet 201, the second permanent magnet 202, and the third permanent magnet 203) has a length in the axial direction expressed as $Z_r$, a width expressed as W (FIG. 10(A)), and a thickness expressed as t. A ratio of the length of the third permanent magnet 203 to the length $Z_r$ of the permanent magnet 2A is expressed as x.

First, when it is assumed that the first permanent magnet 201, the second permanent magnet 202, and the third permanent magnet 203 are all arranged in parallel with the axial direction, a volume of the integrated permanent magnet having a flat-plate shape is expressed by the following expression (11):

[Expression 11]

$$V_1 = W \times Z_r \times t \ldots \quad (11)$$

Next, it is assumed that the first permanent magnet 201 and the second permanent magnet 202 are arranged at the inclination angle θ relative to the axial direction, only the third permanent magnet 203 is arranged in parallel with the axial direction, and the above described width W is reduced by ΔW. In this case, the total volume of the first permanent magnet 201, the second permanent magnet 202, and the third permanent magnet 203 is expressed by the following expression (12):

[Expression 12]

$$V_3 = (W - 2\Delta W) \times \left\{ xZ_r + 2 \times \frac{1-x}{2\cos\theta} Z_r \right\} \times t \quad (12)$$

In the rotor core 10, when an angle range about the axis line CL of a region where one first permanent magnet 201, one second permanent magnet 202, and one third permanent magnet 203 are arranged is 2δ (FIG. 10(A)), the reduced width ΔW can be expressed by the following expression (13):

[Expression 13]

$$\Delta W = \Delta y \times \tan\delta \ldots \quad (13)$$

Here, Δy is an amount of inclination of the first permanent magnet 201 and the second permanent magnet 202 as illustrated in FIG. 15, and is expressed by the following expression (14):

[Expression 14]

$$\Delta y = \frac{1-x}{2} Z_r \tan\theta \quad (14)$$

When the expression (14) is substituted into the expression (13), the obtained ΔW is substituted into the expression (12), and δ is set at 30 degrees, the following expression (15) is obtained:

[Expression 15]

$$V_3 = (W - 2\Delta y \times \tan\delta) \times \left\{ xZ_r + 2 \times \frac{1-x}{2\cos\theta} Z_r \right\} \times t = \quad (15)$$
$$\left( W - \frac{2\Delta y}{\sqrt{3}} \right) \times \left\{ xZ_r + \frac{1-x}{\cos\theta} Z_r \right\} \times t =$$
$$\left( W - \frac{1-x}{\sqrt{3}} Z_r \tan\theta \right) \times \left( x + \frac{1-x}{\cos\theta} \right) Z_r \times t$$

Here, in accordance with the inclination angle θ of each of the first permanent magnet 201 and the second permanent magnet 202 relative to the axial direction, the axial direction length $Z_r$ and the width W of the permanent magnet 2A (the first permanent magnet 201, the second permanent magnet 202, and the third permanent magnet 203) and the ratio x of the length of the third permanent magnet 203 with respect to the length $Z_r$ are determined so that the volume $V_1$ in the expression (11) and the volume $V_3$ in the expression (15) are the same as each other.

If the volume is the same as that when the first permanent magnet 201, the second permanent magnet 202, and the third permanent magnet 203 are all arranged in parallel with the axial direction (i.e., $V_1 = V_3$), an area of the surface facing the stator core 50 is also the same since the thickness t is common. Thus, sufficient effective magnetic fluxes can be obtained. Accordingly, the first permanent magnet 201, the second permanent magnet 202, and the third permanent magnet 203 can be efficiently arranged.

As in the first embodiment, the first permanent magnet 201, the second permanent magnet 202, and the third permanent magnet 203 are composed of rare earth magnets mainly containing neodymium, iron, boron or ferrite sintered magnets mainly containing iron oxide.

The rotor core 10 of the second embodiment is formed by stacking electromagnetic steel sheets and integrating the electromagnetic steel sheets (for example, fastening them by crimping). Specifically, first, a center part of the rotor core 10 in the axial direction is formed by stacking electromagnetic steel sheets having third magnet insertion holes 113 and integrating them, and then, the third permanent magnets 203 are inserted in the third magnet insertion holes 113.

Next, electromagnetic steel sheets having first magnet insertion holes 111 and electromagnetic steel sheets having second magnet insertion holes 112 are stacked on both ends of the center part of the rotor core 10 in the axial direction and are integrated. Thereafter, the first permanent magnets 201 and the second permanent magnets 202 are inserted into the first magnet insertion holes 111 and the second magnet insertion holes 112, respectively.

Figure 16:
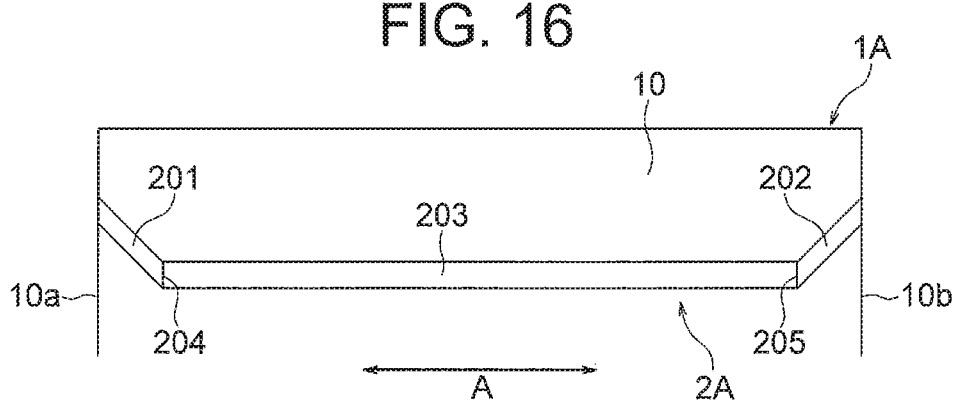
FIG. 16 is a schematic view illustrating a configuration example of the rotor according to the second embodiment.
Figure 17:
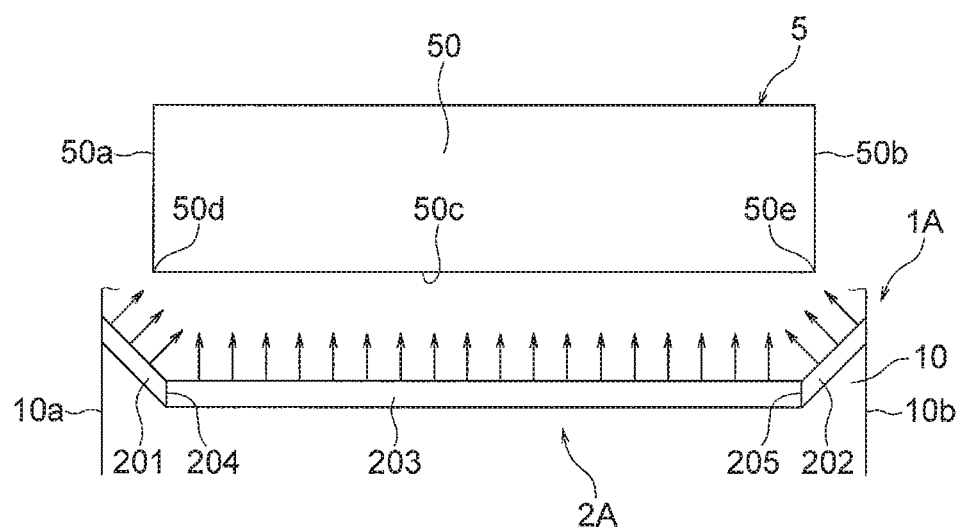
FIG. 17 is a schematic view for describing flows of magnetic fluxes from the first permanent magnet, the second permanent magnet, and the third permanent magnet in the rotor illustrated in FIG. 16.

FIG. 16 is a schematic view illustrating a configuration example of a rotor 1A according to the second embodiment. FIG. 17 is a schematic view illustrating a relationship between the rotor 1A illustrated in FIG. 16 and the stator 5. In the configuration example illustrated in FIG. 16, the first permanent magnet 201 and the second permanent magnet 202 are arranged so that the third permanent magnet 203 faces both ends 50d and 50e of the inner circumferential surface 50c of the stator core 50.

In the configuration illustrated in FIG. 16, the third permanent magnet 203 occupies most part of the permanent magnet 2A. More specifically, the length of the third permanent magnet 203 in the axial direction is larger than a sum of the lengths of the first permanent magnet 201 and the second permanent magnet 202 in the axial direction. Accordingly, the distance from the permanent magnet 2A to the stator core 50 can be further reduced, and thereby effective magnetic fluxes entering the stator core 50 can be further increased.

As described above, in the second embodiment of the present invention, the third permanent magnet 203 parallel to the axial direction is provided between the first permanent magnet 201 and the second permanent magnet 202. Thus, leakage magnetic fluxes from the ends of the first permanent magnet 201 and the second permanent magnet 202 can be reduced, and the distance from the permanent magnet 2A to the stator core 50 can be reduced, so that effective magnetic fluxes can be increased. Accordingly, energy efficiency of the motor 100 can be further enhanced.

Further, the length of the third permanent magnet 203 in the axial direction is made longer than the sum of the lengths of the first permanent magnet 201 and the second permanent magnet 202 in the axial direction. Thus, the distance from the permanent magnet 2A to the stator core 50 can be further reduced, and effective magnetic fluxes can be further increased.

The first and second embodiments may have various modifications. For example, in the first embodiment, the first permanent magnet 21 and the second permanent magnet 22 having flat-plate shapes have been described. However, as in the permanent magnet 2B illustrated in FIG. 18, first permanent magnet 211 and second permanent magnet 212 having curved shapes may be used.

Figure 18:
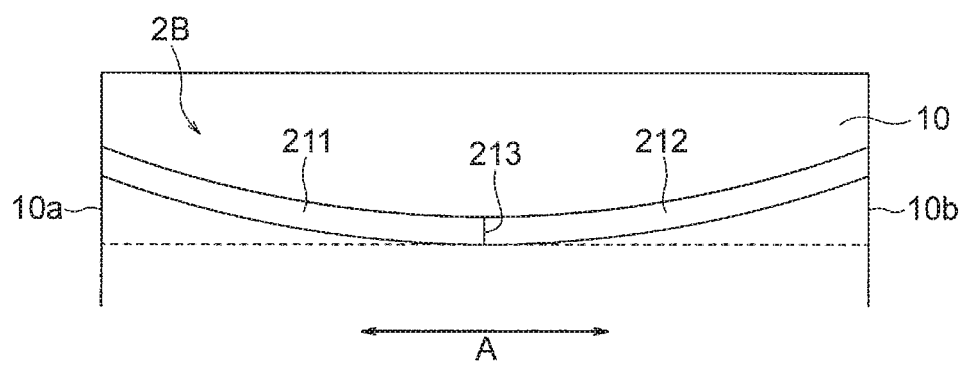
FIG. 18 is a schematic view illustrating a configuration of a modification of the first embodiment.

The first permanent magnet 211 and the second permanent magnet 212 illustrated in FIG. 18 are curved so that distances from the axis line CL increase (distances to the outer circumferential surface of the rotor core 10 decrease) toward the first end 10a and the second end 10b along the axial direction. In this specification, such a curve is included in "inclination." It is also possible to provide a third permanent magnet parallel to the axial direction between the first permanent magnet 211 and the second permanent magnet 212.

In the first and second embodiments, the number of poles of the rotor 1(1A) is six. However, the number of poles is not limited to six, and it is sufficient that the number of poles is two or more.

Air Conditioning Apparatus

Figure 19:
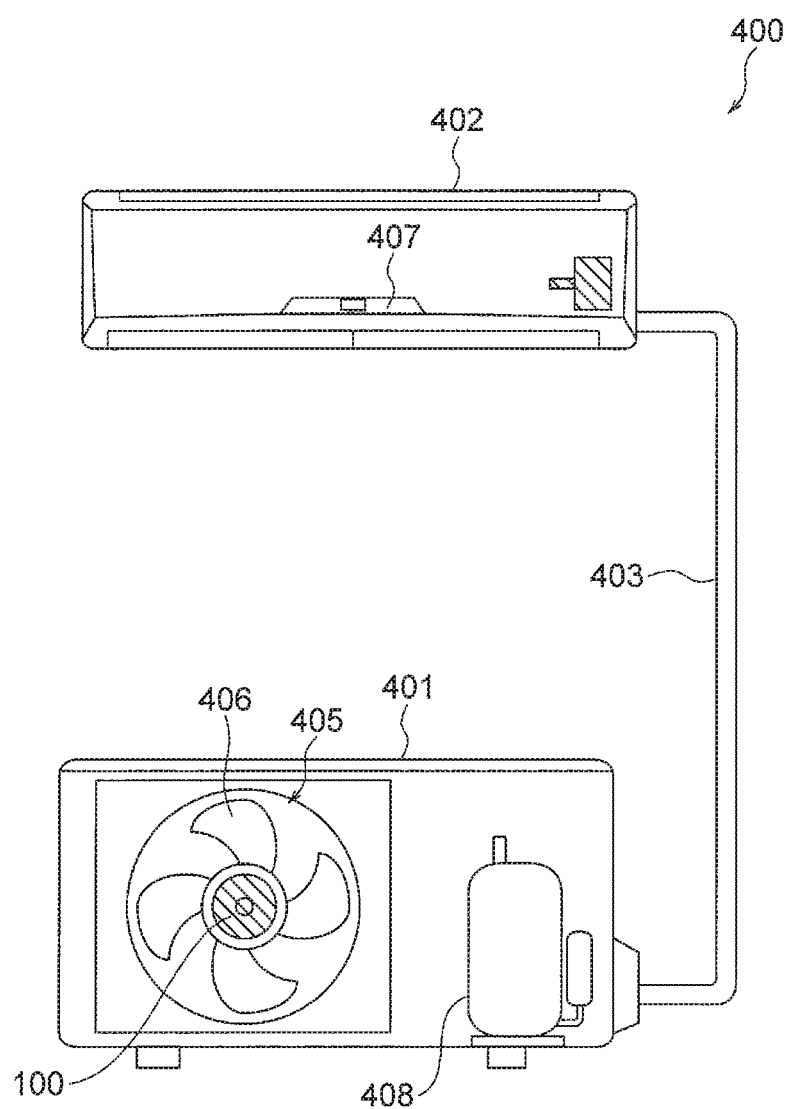
FIG. 19 is a view illustrating an air conditioning apparatus including a fan to which the motor according to each of the embodiments is applied.

Next, an air conditioning apparatus using the motor according to each of the above described embodiments will be described. FIG. 19 is a view illustrating a configuration of an air conditioning apparatus 400 using the motor according to each of the embodiments. The air conditioning apparatus 400 includes an outdoor unit 401, an indoor unit 402, and a refrigerant pipe 403 connecting these units.

The outdoor unit 401 includes an outdoor fan 405 serving as a fan. The indoor unit 402 includes an indoor fan 407. FIG. 19 also illustrates a compressor 408 for compressing refrigerant in the outdoor unit 401.

The outdoor fan 405 of the outdoor unit 401 includes a motor 100 to which the motor described in each of the embodiments is applied. A blade 406 is attached to a shaft 4 (FIG. 1) of the motor 100. When the rotor 1 (FIG. 1) of the motor 100 rotates, the blade 406 attached to the shaft 4 rotates and sends air to outdoors.

In a case where the air conditioning apparatus 400 performs a cooling operation, heat released when refrigerant compressed by the compressor 408 is condensed by a condenser (not shown) is released to outdoors by air blow of the outdoor fan 405.

The motor 100 of each of the above described embodiments enhances energy efficiency by reducing leakage magnetic fluxes. Thus, by using the motor 100 according to each of the embodiments as a power source of the outdoor fan 405, energy efficiency of the outdoor fan 405 can be enhanced. As a result, energy consumption of the air conditioning apparatus 400 can be reduced.

In this example, the motor described in each of the embodiments is applied to the motor 100 for the outdoor fan 405 of the outdoor unit 401. However, the motor 100 according to each of the embodiments may be applied to the indoor fan 407 of the indoor unit 402.

Scroll Compressor

Figure 20:
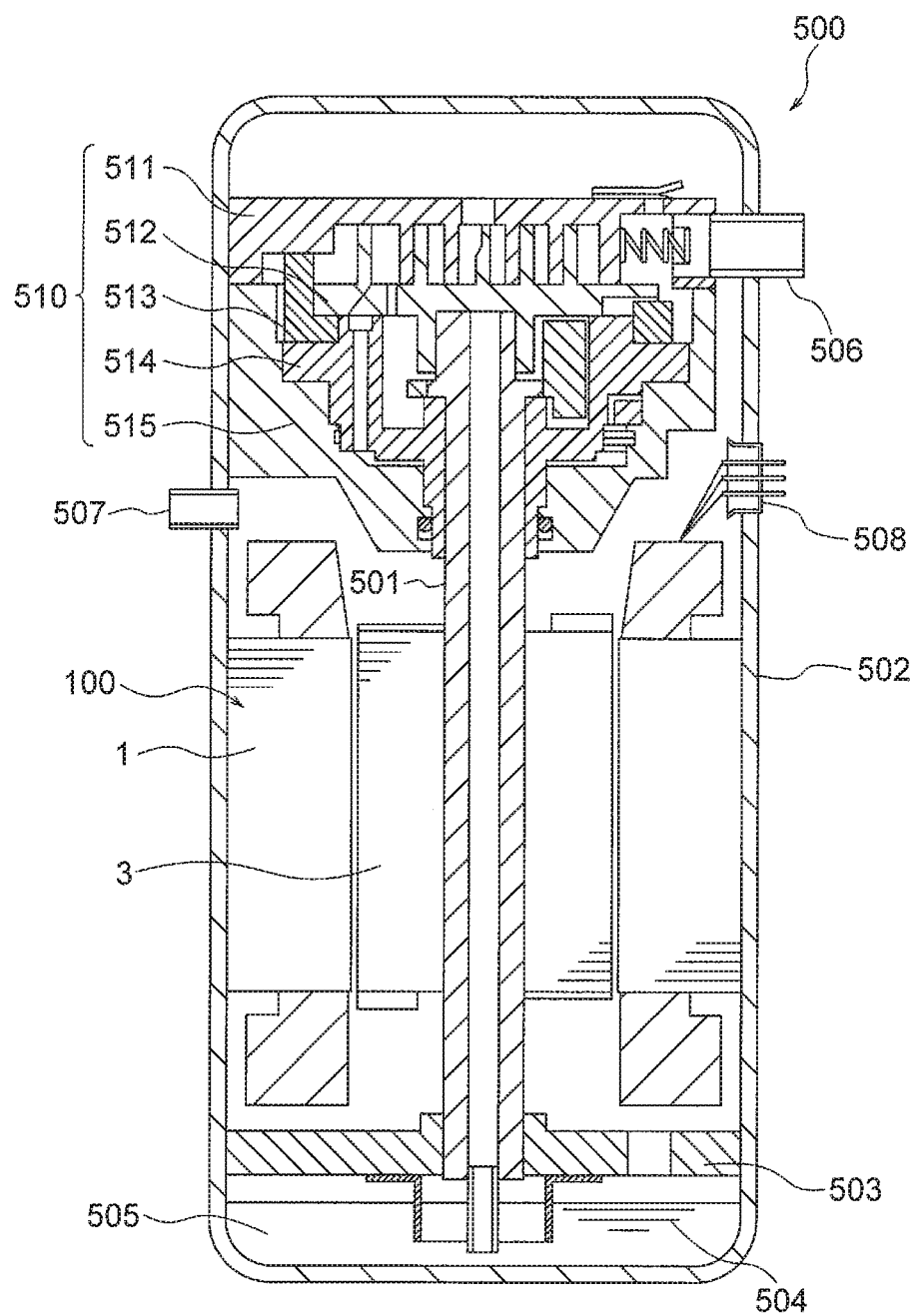
FIG. 20 is a view illustrating a compressor to which the motor according to each of the embodiments is applied.

Next, a scroll compressor using the motor according to each of the embodiments will be described. FIG. 20 is a sectional view illustrating a configuration of a scroll compressor 500 using the motor according to each of the above described embodiments.

The scroll compressor 500 includes, in a closed container 502, a compression mechanism 510, a motor 100 for driving the compression mechanism 510, a main shaft 501 connecting the compression mechanism 510 and the motor 100 to each other, a sub frame 503 supporting an end (a sub-shaft part) of the main shaft 501 opposite to the compression mechanism 510, and refrigerating machine oil 504 stored in an oil sump 505 in a bottom part of the closed container 502.

The compression mechanism 510 includes a fixed scroll 511 and a swing scroll 512 combined to form a compression chamber between their plate-shaped scroll teeth, an Oldham ring 513, a compliant frame 514, and a guide frame 515.

A suction pipe 506 penetrating the closed container 502 is press fitted into the fixed scroll 511. Also provided is a discharge pipe 507 penetrating the closed container 502 for discharging a high-pressure refrigerant gas discharged from a discharge port of the fixed scroll 511 to outside (a refrigeration cycle).

A glass terminal 508 for electrically connecting the stator 5 of the motor 100 and a driving circuit to each other is fixed to the closed container 502 by welding. The motor of each of the embodiments is applied to the motor 100.

The motor 100 of each of the above described embodiments enhances energy efficiency by reducing leakage magnetic fluxes. Thus, by using the motor 100 as a power source of the scroll compressor 500, energy consumption of the scroll compressor 500 can be reduced.

Here, the scroll compressor 500 has been described as an example of the compressor. However, the motor of each of the embodiments may be applied to compressors other than the scroll compressor 500.

Although preferred embodiments of the present invention have been specifically described, the present invention is not limited to the embodiments described above, and various modifications and variations may be made without departing from the gist of the invention.

What is claimed is:

1. A rotor comprising:
   a rotor core having a cylindrical outer circumferential surface about an axis line, the rotor core further having a first end and a second end that are both ends of the rotor core in a direction of the axis line, the rotor core further having a first magnet insertion hole in a region of the rotor core having the first end and a second magnet insertion hole in another region of the rotor core having the second end;
   a first permanent magnet disposed in the first magnet insertion hole; and
   a second permanent magnet disposed in the second magnet insertion hole,
   wherein the first permanent magnet is inclined so that a distance from the axis line to the first permanent magnet increases in a direction along the axis line toward the first end;
   wherein the second permanent magnet is inclined so that a distance from the axis line to the second permanent magnet increases in a direction along the axis line toward the second end;
   wherein the first permanent magnet has a thickness which is constant throughout a length of the first permanent magnet in the direction of the axis line, and the second permanent magnet has a thickness which is constant throughout a length of the second permanent magnet in the direction of the axis line;
   wherein the first permanent magnet has a length in a circumferential direction of the rotor core that is shorter at a center part than at the first end of the rotor core in the direction of the axis line; and
   wherein the second permanent magnet has a length in a circumferential direction of the rotor core that is shorter at the center part than at the second end of the rotor core in the direction of the axis line.

2. The rotor according to claim 1, wherein each of the first permanent magnet and the second permanent magnet is composed of a rare earth magnet containing neodymium, iron, boron, and dysprosium, or a ferrite sintered magnet containing iron oxide.

3. The rotor according to claim 1, wherein the rotor core is formed of a powder magnetic core.

4. The rotor according to claim 1, wherein the rotor core is formed of stacked steel sheets.

5. The rotor according to claim 1, wherein the first magnet insertion hole has openings on both sides of the first permanent magnet in a circumferential direction of the rotor core, and wherein the second magnet insertion hole has openings on both sides of the second permanent magnet in the circumferential direction.

6. The rotor according to claim 1, wherein a border between the first permanent magnet and the second permanent magnet is located at a center part of the rotor core in the direction of the axis line.

7. The rotor according to claim 1, further comprising a third permanent magnet disposed in the rotor core, the third permanent magnet being located between the first permanent magnet and the second permanent magnet in the direction of the axis line.

8. The rotor according to claim 7, wherein the third permanent magnet extends in parallel with the direction of the axis line.

9. The rotor according to claim 7, wherein the third permanent magnet has a length in the direction of the axis line that is longer than a sum of lengths of the first permanent magnet and the second permanent magnet in the direction of the axis line.

10. A motor comprising a stator and a rotor disposed inside the stator,
    the rotor comprising:
    a rotor core having a cylindrical outer circumferential surface about an axis line, the rotor core further having a first end and a second end that are both ends in a direction of the axis line, the rotor core further having a first magnet insertion hole in a region of the rotor core having the first end and a second magnet insertion hole in another region of the rotor core having the second end;
    a first permanent magnet disposed in the first magnet insertion hole; and
    a second permanent magnet disposed in the second magnet insertion hole,
    wherein the first permanent magnet is inclined so that a distance from the axis line to the first permanent magnet increases in a direction along the axis line toward the first end;
    wherein the second permanent magnet is inclined so that a distance from the axis line to the second permanent magnet increases in a direction along the axis line toward the second end;
    wherein the first permanent magnet has a thickness which is constant throughout a length of the first permanent magnet in the direction of the axis line, and the second permanent magnet has a thickness which is constant throughout a length of the second permanent magnet in the direction of the axis line;
    wherein the first permanent magnet has a length in a circumferential direction of the rotor core that is shorter at a center part than at the first end of the rotor core in the direction of the axis line; and
    wherein the second permanent magnet has a length in a circumferential direction of the rotor core that is shorter at the center part than at the second end of the rotor core in the direction of the axis line.

11. The motor according to claim 10, wherein the stator includes a stator core, and
    wherein the rotor core has a length in the direction of the axis line that is longer than a length of the stator core in the direction of the axis line.

12. The motor according to claim 11, wherein the length of the rotor core is expressed as Zr, the length of the stator core is expressed as Zs, a gap between the rotor core and the stator core is expressed as g, and a minimum distance from the outer circumferential surface of the rotor core to the first permanent magnet or the second permanent magnet is expressed as h, an inclination angle θ of each of the first permanent magnet and the second permanent magnet relative to the axis line is in a range expressed as follows:

$$0 < \theta < \tan^{-1}\left\{\frac{Z_r - Z_s}{2(g + h)}\right\}.$$

13. A fan comprising a blade and a motor rotating the blade, the motor comprising a stator and a rotor disposed inside the stator,
the rotor comprising:
a rotor core having a cylindrical outer circumferential surface about an axis line, the rotor core further having a first end and a second end that are both ends in a direction of the axis line, the rotor core further having a first magnet insertion hole in a region of the rotor core having the first end and a second magnet insertion hole in another region of the rotor core having the second end;
a first permanent magnet disposed in the first magnet insertion hole; and
a second permanent magnet disposed in the second magnet insertion hole,
wherein the first permanent magnet is inclined so that a distance from the axis line to the first permanent magnet increases in a direction along the axis line toward the first end;
wherein the second permanent magnet is inclined so that a distance from the axis line to the second permanent magnet increases in a direction along the axis line toward the second end;
wherein the first permanent magnet has a thickness which is constant throughout a length of the first permanent magnet in the direction of the axis line, and the second permanent magnet has a thickness which is constant throughout a length of the second permanent magnet in the direction of the axis line;
wherein the first permanent magnet has a length in a circumferential direction of the rotor core that is shorter at a center part than at the first end of the rotor core in the direction of the axis line; and
wherein the second permanent magnet has a length in a circumferential direction of the rotor core that is shorter at the center part than at the second end of the rotor core in the direction of the axis line.

14. An air conditioning apparatus comprising an outdoor unit, an indoor unit, and a refrigerant pipe connecting the outdoor unit and the indoor unit,
at least one of the outdoor unit and the indoor unit comprising a fan,
the fan comprising a blade and the motor according to claim 13 rotating the blade.

15. A compressor comprising a closed container, a compression mechanism disposed in the closed container, and a motor driving the compression mechanism,
the motor comprising a stator and a rotor disposed inside the stator,
the rotor comprising:
a rotor core having a cylindrical outer circumferential surface about an axis line, the rotor core further having a first end and a second end that are both ends in a direction of the axis line, the rotor core further having a first magnet insertion hole in a region of the rotor core having the first end and a second magnet insertion hole in another region of the rotor core having the second end;
a first permanent magnet disposed in the first magnet insertion hole; and
a second permanent magnet disposed in the second magnet insertion hole,
wherein the first permanent magnet is inclined so that a distance from the axis line to the first permanent magnet increases in a direction along the axis line toward the first end;
wherein the second permanent magnet is inclined so that a distance from the axis line to the second permanent magnet increases in a direction along the axis line toward the second end;
wherein the first permanent magnet has a thickness which is constant throughout a length of the first permanent magnet in the direction of the axis line, and the second permanent magnet has a thickness which is constant throughout a length of the second permanent magnet in the direction of the axis line;
wherein the first permanent magnet has a length in a circumferential direction of the rotor core that is shorter at a center part than at the first end of the rotor core in the direction of the axis line; and
wherein the second permanent magnet has a length in a circumferential direction of the rotor core that is shorter at the center part than at the second end of the rotor core in the direction of the axis line.

16. The motor according to claim 11, wherein the first permanent magnet outwardly projects in the direction of the axis line with respect to an end portion of the stator core in the direction of the axis line, and
wherein the second permanent magnet outwardly projects in the direction of the axis line with respect to the other end portion of the stator core in the direction of the axis line.

* * * * *